UNITED STATES PATENT OFFICE 2,444,945

DIOLEFIN EXTRACTION

Charles E. Morrell, Westfield, N. J., assignor to Standard Oil Development Company, a corporation of Delaware No Drawing. Application December 30, 1944, Serial No. 570,745

4 Claims. (Cl. 260—681.5)

This invention relates to improvements in processes for extracting and concentrating olefins and relates particularly to improvements in processes for extracting and concentrating butadiene or other unsaturated hydrocarbons when cuprous salt solutions are used as the extraction agents.

The use of cuprous salt solutions, especially those containing ammonia, has been extensively developed for concentrating butadiene from hydrocarbon mixtures. Cuprous solutions of 1.5 to 5 mols per liter copper content are used to extract butadiene. The preferred solution contains about 1.5 to 3.5 mols per liter of copper and the total ammonia 10.5 to 11.0 mols per liter, acetic acid 4 mols per liter when cuprous acetate is used, and the balance water and possesses a pH value of about 10.5 to 12.5.

The ammoniacal cuprous acetate solutions are generally preferred due to their low viscosity, but ammoniacal cuprous lactate solutions have likewise been used, for example, a solution containing 1.5 to 3.5 mols of copper, 8.0 mols ammonia, 3 to 5 mols ammonium lactate. It may be possible to prepare ammoniacal lactate solutions having a copper content of about 1.5 to 5 mols of copper, 8.0 to 12.0 mols of ammonia and 3.0 to 6.0 mols of ammonium lactate.

An ammoniacal cuprous tartrate solution was likewise used, one containing 1.5 to 3.5 mols of copper, 8.0 to 12 mols of ammonia and 3 to 6 mols of ammonium tartrate. Other ammoniacal cuprous salt solution such as cuprous chloride may be used.

Ordinarily hydrocarbon gases containing crude butadiene also contain small but varying amounts of acetylenic materials. It is desired to remove these acetylenes in such a manner that they do not contaminate the separated purified butadiene. The acetylenes are readily absorbed and removed by the cuprous salt solutions from hydrocarbon mixtures as they are fairly soluble in the cuprous salt solutions. One procedure which is in common practice for preventing these acetylenes from contaminating the butadiene product is to heat the solution under appropriate conditions to polymerize the acetylenes dissolved therein. The polymeric products from such a process are quite varied in nature. Some of the polymeric products are liquids which are insoluble in the cuprous salt solution and are readily removed from the copper solution by settling or by washing with an appropriate solvent such as hydrocarbons. Liquid polymers of this type predominate when ethyl acetlyene is the main acetylenic constituent of the crude butadiene. When vinyl acetylene is present in large amounts, plastic or semi-solid materials are formed. These may be removed by filtration according to customary practice or by washing the solution with a hydrocarbon fraction in which these solid materials are readily slurried. The solid polymers ordinarily retain considerable quantities of the cuprous salt solution and as these polymers are ordinarily discarded it is desirable to recover the cuprous salts therefrom.

According to this invention this recovery operation is most advantageously conducted as set forth in the following example: The filtered polymer is washed first with a water solution with a high amine content used for solubilizing copper in the concentrating solution. In the case of ammonia this aqueous solution should contain ammonia to the extent of 5-50% by weight, preferably 15% to 30%. The ammonia or amine concentration is maintained sufficiently high in the washing liquid to provide a wash liquid with a pH value of above 9.5, preferably 10 to 13. The washing operation may be carried out at temperatures between room (50° F.) temperature and 200° F. Preferably temperatures in the upper portion of this specified range are used. The ammonia is then removed from the filtered polymer by washing with water and the polymer discarded. The two washing liquors, one relatively rich in ammonia and the other relatively poor in ammonia, are then fed separately or in admixture with each other to a zone for removing water so that the copper concentration is restored to the value characteristic of the solution used in the extraction step. Removal of water in this manner can be most conveniently effected by feeding the wash liquors to a hot zone in which a boiling liquid phase is maintained. The composition of this boiling liquid phase must be maintained such that the copper concentration is at least about two mols per liter of solution and the pH value above 9.5. Maintenance of copper concentrations above this minimum value is necessary to prevent precipitation of the copper. Heat may be supplied to the boiling liquid by transfer through the container walls or through heating coils. Also quantities of the amine used for solubilizing copper in the solution must be supplied continually to the boiling liquid to replace that which is carried off by the water vapor. The water vapor taken overhead is condensed and the amine removed therefrom by distillation. This also applies to the recovery of copper solutions from filter cakes resulting from the filtration of copper solvents, which may be used for extraction of olefins and diolefins, especially of 4 or 5 carbon atoms, which contain acetylenes or other materials forming solid polymers in the solution.

Ammoniacal cuprous acetate solutions of the type employed in the butadiene extraction process cause no significant corrosion of ordinary steel but when the concentration of cuprous copper or the pH value or both are changed, using weaker solutions or solutions of lower pH value, they are capable of corroding steel as shown by the following table:

| Solution | | Loss in Wt., mg.[1] |
|---|---|---|
| No. | Description | |
| 1 | 3.1 N Cu$^+$; 0.3 N cu$^{++}$; 4.1 N Acetate; 11.5 N NH$_3$ | 0.0 |
| 2 | Solution 1 diluted with 28% NH$_3$ water to 0.5 N Cu$^+$ | 0.0 |
| 3 | Solution 1 diluted with 28% NH$_3$ water to 0.1 N Cu$^+$ | 0.2 |
| 4 | Solution 1 diluted with 5% NH$_3$ water to 0.5 N Cu$^+$ | 0.3 |
| 5 | Solution 1 diluted with 5% NH$_3$ water to 0.1 N Cu$^+$ | [2] −1.4 |

[1] Negative values indicate an increase in weight. Changes in weight of ±0.2 mg represents the probable limit of reproducibility.
[2] Test strips gave visible evidence of slight copper deposition.

From these results it was found the washing of filter cakes to remove residual copper should be conducted using a strong aqueous ammonia as the washing medium. Use of 28% aqueous ammonia appears from visual observation of laboratory steel test strips to be definitely preferable to the use of 5% aqueous ammonia. Use of washing media of ammonia concentrations intermediate between these values is undoubtedly quite permissible.

What is claimed is:

1. The improvement in the extraction of olefins which comprises contacting a mixture of saturated and unsaturated hydrocarbons containing an olefin and an acetylene with a solvent solution of a cuprous salt to form addition compounds of the cuprous copper, the olefins and the acetylene, separating the said solution of the cuprous salt with the addition products dissolved therein from the unabsorbed saturated and unsaturated hydrocarbons, heating the separated solution of cuprous salt with addition products dissolved therein to polymerize the acetylene, filtering the said heated solution of cuprous salt to separate the solid polymers of the acetylenes that are formed on heating, thereby obtaining a filtered solid containing copper salts, washing the solids on the filter thereby obtained with a strong amine solution to extract soluble copper salts from said solid.

2. The improvement in the extraction of olefins which comprises contacting a mixture of saturated and unsaturated hydrocarbons containing an olefin and acetylene with an ammoniacal cuprous salt solution to form addition compounds of the cuprous copper, the olefin and the acetylene, separating the said ammoniacal cuprous salt solution with the addition compounds dissolved therein from the unabsorbed saturated and unsaturated hydrocarbons, heating the ammoniacal salt solution of the addition products to polymerize the acetylene, filtering the heated solution to separate the polymer solid of the acetylene that is formed on heating from the ammoniacal cuprous salt solution, thereby obtaining a filtered solid containing copper salts washing the polymer of acetylene obtained by filtering with an amine solution having a pH value of at least 10 to recover the cuprous salt and heating the amine solution to evaporate water and obtain a cuprous salt solution having at least 1.5 mols of copper per liter.

3. The improvement in the separation of butadiene and acetylenes which comprises contacting a mixture of saturated and unsaturated hydrocarbons containing said compounds with an amine-containing cuprous salt solution to form addition compounds of the cuprous copper with the butadiene and the acetylenes, separating the said amine-cuprous salt solution with the addition compounds dissolved therein from the unabsorbed mixture of saturated and unsaturated hydrocarbons, separating the cuprous salt solution, heating the said separated cuprous salt solution to polymerize the acetylenes dissolved therein, filtering the heated cuprous salt solution to separate the acetylene polymer solids from the cuprous salt solution, thereby obtaining a filtered solid containing copper salts washing the acetylene polymers on the filter, at temperatures ranging from 50° F. to 200° F., with an amine solution having a pH value of at least 10, to extract copper salts from said polymer passing the dilute washing solution into a bath of ammoniacal cuprous salt solution containing at least about 1.5 mols per liter of cuprous copper and having a pH value of at least 9.5 and heating the ammoniacal cuprous salt solution to drive off water and obtain a solution having at least 1.5 mols per liter of cuprous copper.

4. An improvement in the separation of butadiene and acetylenes which comprises contacting a mixture of saturated and unsaturated hydrocarbons containing said compounds with a cuprous salt solution containing 1.5 to 5 mols of copper per liter, 10.5 to 11.0 mols total ammonia per liter, 4 mols acetic acid per liter and the balance water, separating the cuprous salt solution from the unabsorbed saturated and unsaturated hydrocarbon mixture, heating the said separated cuprous salt solution to polymerize the acetylenes dissolved therein, filtering the heated cuprous salt solution to separate the acetylene polymer solids, thereby obtaining a filtered solid containing copper salts, washing the polymer solids on the filter with an amine solution having a pH value of at least 10, at temperatures ranging from 50° F. to 200° F., passing the dilute washing solution into a hot bath of ammoniacal cuprous salt solution having a pH value of at least 10, and containing at least about 1.5 mols per liter of cuprous copper, and heating the ammoniacal cuprous salt solution to drive off water and obtain a solution having at least 1.5 mols per liter of cuprous copper.

CHARLES E. MORRELL.

REFERENCES CITED

The following references are of record in the file of this patent:

UNITED STATES PATENTS

| Number | Name | Date |
|---|---|---|
| 1,795,549 | Feiler | Mar. 10, 1931 |
| 2,275,135 | Fasce | Mar. 3, 1942 |
| 2,370,809 | Morrell et al. | Mar. 6, 1945 |
| 2,383,784 | Fleer | Aug. 28, 1945 |